United States Patent
Schanz et al.

(10) Patent No.: US 6,396,048 B1
(45) Date of Patent: May 28, 2002

(54) DEVICE AND METHOD FOR DETECTING AN OPTICAL SIGNAL

(75) Inventors: Michael Schanz, Oberhausen; Bedrich Hosticka; Christian Nitta, both of Duisburg, all of (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/462,443
(22) PCT Filed: Aug. 14, 1997
(86) PCT No.: PCT/EP97/04453
§ 371 (c)(1),
(2), (4) Date: Apr. 25, 2000
(87) PCT Pub. No.: WO99/03261
PCT Pub. Date: Jan. 21, 1999

(30) Foreign Application Priority Data

Jul. 7, 1997 (DE) .......................................... 197 28 886

(51) Int. Cl.[7] .............................................. H01L 31/14
(52) U.S. Cl. .............................. 250/214 LA; 250/208.1
(58) Field of Search .................... 250/214 LA, 214 LS, 250/214 A, 214 R, 214 C, 208.1; 330/308, 86; 348/300, 294

(56) References Cited

FOREIGN PATENT DOCUMENTS

| DE | A-0 135 035 | * 7/1984 | .......... H04N/5/243 |
| JP | A-01 057 813 | * 3/1989 | .......... H03G/11/08 |

* cited by examiner

Primary Examiner—Robert H. Kim
Assistant Examiner—Hoon K. Song
(74) Attorney, Agent, or Firm—Michael A. Glenn; Kirk Wong

(57) ABSTRACT

An optical detector has at least one image sensor element that generates an image sensor element output signal according to the illumination incident on the element. A readout amplifier for the one or each image sensor element is switchable between a plurality of amplification stages for amplifying the respective image sensor element output signal. An amplification switch is provided for comparing the image sensor element output signal with at least one given threshold value before the signal is amplified by the readout amplifier and for switching between the amplification stages of the readout amplifier depending on the result of the comparison. The optical detector has a first output signal indicating the amplified image sensor element output signal and a second output signal indicating the amplification stage to which the amplifier is switched.

6 Claims, 2 Drawing Sheets

DEVICE AND METHOD FOR DETECTING AN OPTICAL SIGNAL

BACKGROUND OF THE INVENTION

1. Field of the Invention

The present invention relates to a device and a method for detecting optical signals and in particular to a device and a method for converting an optical signal into an electrical signal and for reading out the converted electrical signal.

Optical signals are detected e.g. by means of integrated image sensors which are fabricated in MOS technology. A number of image sensor elements are here integrated with additional electronics on an integrated circuit, an IC. The number and the arrangement of the image elements can be varied. For example, one-dimensional arrays, two-dimensional arrays and individual sensors are possible forms.

Various image sensor elements can be realized by means of CMOS technology. Examples are photodiodes, parasitic bipolar transistors, photogates and photosensitive MOS-FETs.

To make the image information available to other components of a full system outside the integrated circuit, the output signal of the image sensor element, or the output signals of the plurality of image sensor elements, must first be read out and then be prepared in a suitable way if necessary. Such preparation may e.g. entail amplification, impedance conversion or a characteristic compression in connection with the output signal of the image sensor element.

In this context "reading out" means that the output signal of the image sensor element is made available to a circuit in the periphery of the image sensor element or of the image sensor array. In such a readout circuit a larger chip area is usually available on the integrated circuit than within the image sensor array. The electrical signal generated by the image sensor element is accessed by the readout circuit via a connection line for the output signal and, possibly, one or more control signals to the image sensor element. It is also known that if all the image sensor elements are not read out simultaneously, each image sensor element has a selection switch to enable all the image sensor elements of an array to be read out.

2. Description of Prior Art

According to the prior art the signals generated by the integrated image sensor elements are accessed using suitable readout circuits, the signals being amplified in the readout circuits. The output signal of image sensor elements is always overlaid with a noise component. Additional noise components accrue due to readout circuit access. It is desirable that these additional noise components be kept as small as possible so that the additional noise component forms only a small part of the total noise component. The reason for this is that if the additional noise component becomes dominant as regards the total noise component, this reduces the quality of the illumination information provided by the integrated image sensor. This is particularly true for small signals, i.e. for an illumination with low brightness.

The readout circuits of image sensor elements and additional subsequent circuits, such as drivers, always contribute to the total noise component. This noise component of the readout circuit or of the additional circuits can only be kept low by investing more effort in the design of the integrated circuit. However, particularly in the case of two-dimensional arrays of image sensor elements, the chip area available on the integrated circuit is generally limited, so that the noise component of the readout circuit relative to the total noise component cannot be kept arbitrarily low.

It is established practice to provide automatic amplification changeover for the read out signal outside an integrated circuit so as to achieve enhanced dynamics or resolution of an analog signal, which is then converted by an A/D converter. This automatic amplification changeover does not, however, contribute to an increase in the signal-noise ratio since all the noise components generated by the readout circuit are also affected by the automatic amplification changeover.

EP 0 135 035 A describes a method for improving the quality of a television picture, wherein an improvement in the image quality is to be achieved through increased amplification of dark parts of the image. The television picture is then displayed on a screen according to the amplification, i.e. with a stronger amplification for dark parts of the image and a smaller amplification for light parts of the image.

The Patent Abstracts of Japan, Vol. 30, No. 268 (E-775), Jun. 20, 1989, disclose an amplifier with adjustable amplification, wherein the amplification is adjusted in accordance with the level of the input signal. The Patent Abstracts of Japan, Vol. 016, No. 465 (E1270), Sep. 28, 1992, disclose an analog/digital converter where an adjustable amplifier is used to obtain a fixed resolution irrespective of an input signal amplitude.

SUMMARY OF THE INVENTION

It is the object of the present invention to provide a device and a method for detecting optical signals such that the output signals display an increased signal-noise ratio.

In accordance with a first aspect of the present invention, this object is achieved by an optical detector comprising:
- at least one image sensor element, which generates an image sensor element output signal according to the illumination incident on the element;
- a readout amplifier switchable between a plurality of amplification stages for the one or each image sensor element for amplifying the respective image sensor element output signal;
- an amplification switch for comparing the image sensor element output signal with at least one given threshold value before the signal is amplified by the readout amplifier and for switching between the amplification stages of the readout amplifier depending on the result of the comparison; and
- a first output signal indicating the amplified image sensor element output signal and a second output signal indicating the amplification stage to which the amplifier is switched.

In accordance with a second aspect of the present invention this object is achieved by a method for detecting an optical signal, comprising the steps of:
- converting the optical signal into an electrical signal by means of an image sensor element;
- comparing the electrical signal with at least one given threshold value;
- switching the amplification of a readout amplifier between a plurality of amplification stages depending on the result of the comparison;
- amplifying the electrical signal according to the amplification stage to which the amplifier is switched to generate an amplified electrical signal; and outputting a first output signal indicating the amplified electrical signal and a second output signal indicating the amplification stage to which the amplifier is switched.

The present invention is based on performing an automatic amplification changeover during the readout process, i.e. when directly accessing the image sensor element. In this way the influences of the noise components of the readout circuit and of all other circuits, such as drivers, which perform additional analog processing of the output signal, can be reduced through the automatic amplification changeover when accessing the image sensor element directly.

If the output signal of the image sensor element is amplified more for small signals, i.e. for small brightnesses of the illumination, than for larger signals, before it reaches the readout circuit, the ratio of signal component to total noise component at the output of the readout circuit increases. Although the noise component of the output signal from the image sensor element is amplified, just like the signal component of the same, the ratio of the noise component of the readout circuit to the noise component of the image sensor element nevertheless decreases, since the noise component of the readout circuit is not amplified. This results in an improvement in the quality of the illumination information at the output of the readout circuit, i.e. the signal-noise ratio of the output signal of the readout circuit is improved.

The present invention can be used for all known image sensor elements, e.g. those fabricated in CMOS technology, such as photodiodes, parasitic bipolar transistors, photogates and photosensitive MOSFETs. Furthermore, the present invention can be used for arbitrary variations in the number and arrangement of the image elements, e.g. one-dimensional arrays, two-dimensional arrays or individual sensors. Access to the individual image sensor elements can be realized in known ways, e.g. by means of selection switches.

BRIEF DESCRIPTION OF THE DRAWINGS

Preferred embodiments of the present invention will be described in more detail below making reference to the enclosed drawings, in which.

DESCRIPTION OF PREFERRED EMBODIMENTS OF THE INVENTION

The fundamentals of a preferred embodiment of the present invention will be described below making reference to FIG. 1, and a detailed explanation of a preferred embodiment of the present invention will then be given making reference to FIG. 2.

Figure 1:
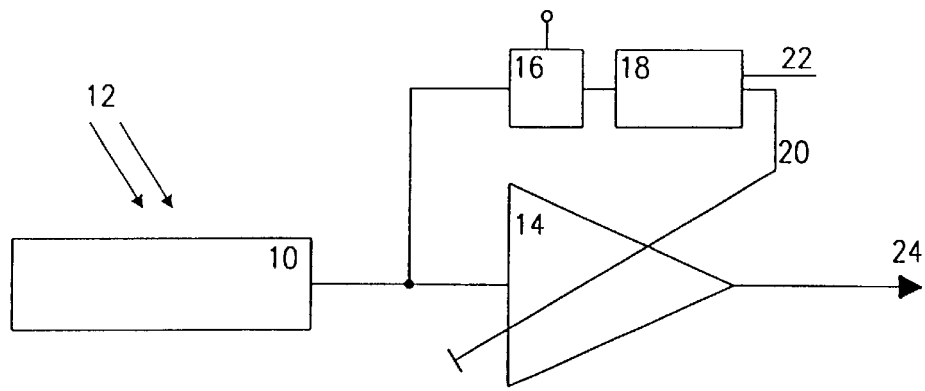
FIG. 1 shows a schematic representation of an embodiment of the device according to the present invention.

In FIG. 1 an image sensor element 10 is shown schematically.

An illumination 12 is incident on the image sensor element. The output line of the image sensor element 10 is connected on the one hand to the input of a readout amplifier 14. On the other hand the output line of the image sensor element 10 is connected to the input of an amplification setting circuit, which in the embodiment shown comprises an analog/digital converter 16 and a coder 18. The coder 18 generates a signal at one of its outputs 20 which depends on the magnitude of the signal output by the image sensor element, the amplification of the readout amplifier 14 being adjusted on the basis of the signal output by the coder 18. Furthermore, at another of its outputs 22 the coder 18 generates a signal indicating the amplification which has been set at the readout amplifier 14.

The image sensor element 10 converts the incident illumination 12 into an electrical output signal. This illumination-dependent output signal is sent to the readout amplifier 14. Before the actual amplification takes place, however, an analog/digital converter 16, which is e.g. formed by window comparators, specifies the voltage range in which the output signal of the image sensor element lies. The analog/digital converter 16 now generates the digital information for the amplification from the specified voltage range with the aid of the digital coder 18. The amplification changeover, i.e. the adjustment of the amplification for the readout amplifier 14, thus takes place automatically. The illumination information, which is represented by the amplified output signal of the image sensor element 10, can now be output. In order to be able to interpret correctly the illumination information output at the output 24, it is necessary to know the selected amplification. For this purpose the information regarding the adjusted amplification is output at the output 22 of the coder 18.

Figure 2:
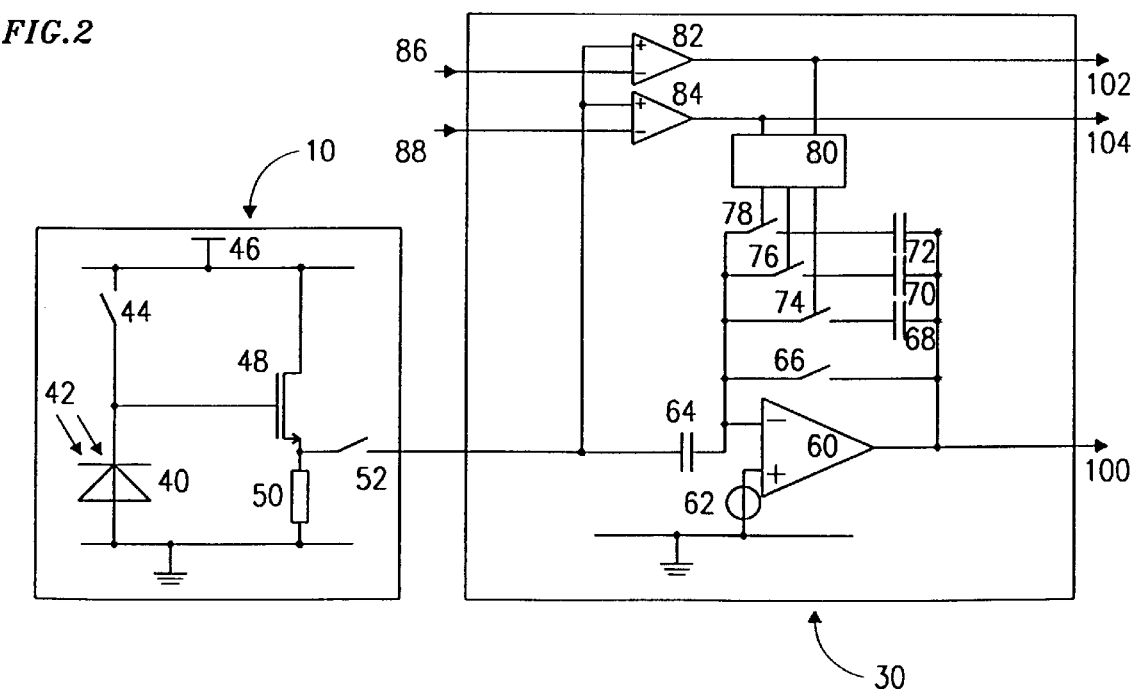
FIG. 2 shows a detailed representation of a preferred embodiment of the present invention.

A preferred embodiment of the present invention is shown in more detail in FIG. 2. The left-hand frame in FIG. 2 represents the image sensor element 10, while the right-hand frame encloses an output circuit, which is designated in toto by the reference numeral 30.

In the depicted embodiment the image sensor element 10 includes a photodiode 40, which can e.g. be subjected to an illumination 42. The n-doped terminal of the photodiode 40 is connected to a switch 44. The other terminal of the switch 44 is connected to a positive supply voltage 46, with a value of e.g. 5 V. The second terminal of the photodiode 40 is connected to ground. The n-doped terminal of the photodiode 40 is also connected to the gate electrode of a field effect transistor 48, whose drain electrode is connected to the positive supply voltage 46 and whose source electrode is connected to the first terminal of an impedance 50. The second terminal of the impedance 50 is connected to ground. A switch 52 is connected to the connection point between the field effect transistor 48 and the impedance 50.

The field effect transistor 48 and the impedance 50 constitute a source follower which enables the voltage at the n-doped terminal of the photodiode 40 to be buffered.

In the following the generation of the illumination-dependent output signal of the image sensor element 10 will be described briefly. At the start the n-doped terminal of the photodiode 40 is short-circuited to the supply voltage 46 by closing the switch 44. The switch 44 is then opened. The potential of the n-doped terminal of the photodiode 40 falls with time due to the photocurrent flowing through the photodiode. The greater the illumination 42, the greater the time-dependent decrease in the potential. As mentioned above, the voltage at the n-doped terminal of the photodiode 40 is buffered by the source follower circuit 48, 50.

After a certain time has elapsed, the image sensor element is accessed via the switch 52. The access speed is increased due to the source follower. During the whole of the access time the switch 52 remains closed.

The readout circuit 30 includes an operational amplifier 60. In the depicted embodiment the working point of the operational amplifier 60 is fixed via a voltage source 62. The inverting input of the operational amplifier 60 is connected to the second terminal of the switch 52 via a capacitor 64. The output of the operational amplifier 60 can be coupled back directly to its inverting input via a switch 66. The output of the operational amplifier 60 can also be connected to its inverting input via capacitors 68, 70 and 72 and switches 74, 76 and 78.

The switches 74, 76 and 78 can be controlled via a coder 80, which, in the depicted embodiment, has three outputs for this purpose. In the depicted embodiment the coder 80 has two inputs, which are connected to the outputs of two window comparators 82, 84. The inverting inputs of the window comparators 82 and 84 have preset voltages 86 and 88 respectively applied to them. The illumination-dependent output signal of the image sensor element 10 is coupled to the non-inverting inputs of the window comparators 82 and 84 via the switch 52. The window comparators 82 and 84 constitute an analog/digital converter comparison device.

The output signal representing the amplified illumination-dependent output signal of the image sensor element 10 can be tapped off at an output 100 of the integrated circuit. Outputs 102, 104 of the integrated circuit are connected to the outputs of the window comparators 82 and 84 and serve to indicate the amplification which has been set for the readout amplifier.

At the start of a readout operation the operational amplifier 60, whose working point has been fixed via the voltage source 62, must be coupled back via the switch 66. During this time the window comparators 82 and 84 compare the output voltage of the image sensor element 10 with the predetermined voltages 86, 88, which constitute the changeover thresholds for changing the amplification and which may e.g. be applied externally. The predetermined voltages 86, 88 may e.g. have the values 0.7 V and 1.4 V. Depending on the comparison of the output signal of the image sensor element 10 with the predetermined voltages 86, 88, one of the capacitors 68, 70, 72 is switched into the feedback path of the operational amplifier 60 by closing one of the switches 74, 76, 78 via the coder network 80. At the same time the switch 66 is opened. The capacitors 68, 70 and 72 have different capacitances so as to allow different amplifications of the operational amplifier 60 to be achieved. After the switch 66 has been opened, a voltage value which amplifies the output voltage of the image sensor element 10 by a factor equal to the capacitance of the capacitor 64 divided by the capacitance of the selected capacitor 68, 70 or 72 is obtained at the output of the readout circuit, i.e. at the output 100. It is obvious that the capacitors 68, 70 and 72 are dimensioned in accordance with the desired amplification. For high amplifications smaller values than the capacitance of the capacitor 64 must be chosen for the capacitors 68, 70 and 72, whereas for low amplifications appropriately higher capacitances must be chosen.

The functionality of the SC amplification circuit (SC= Switched Capacitors) is determined by the arrangement of the operational amplifier 60, the switches 66, 74, 76, 78 and the capacitors 64, 68, 70 and 72. The number of stages for the amplification changeover can be chosen freely, as can the voltage values of the changeover thresholds. The depicted embodiment employs three different amplifications and two changeover thresholds, the predetermined voltages 86 and 88.

It is obvious to persons skilled in the art that the preferred embodiment of the present invention described with reference to FIG. 1 and FIG. 2 serves illustrative purposes only, it being possible to employ any kind of operational amplifier with variable amplification. Furthermore, it is, according to the present invention, possible to employ any kind of amplification adjuster which is capable of detecting the unamplified output signal of an image sensor element and adjusting the amplification of the readout amplifier on the basis of the magnitude of this signal.

Figure 3:
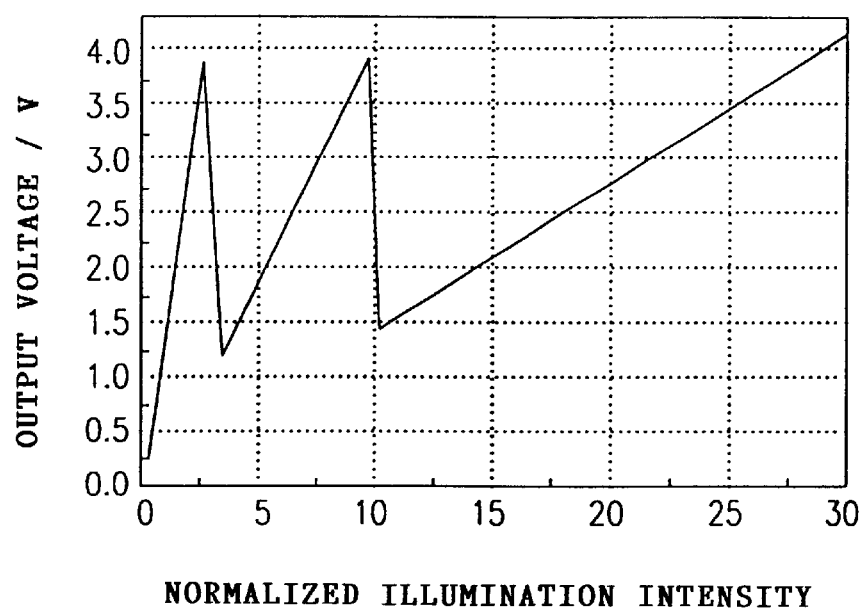
FIG. 3 shows an exemplary diagram of a characteristic of the output voltage of an embodiment of the device according to the present invention plotted against a normalized illumination intensity.

FIG. 3 shows the characteristic of the output voltage jump in volts plotted against a normalized illumination intensity for the circuit example of the automatic amplification changeover explicitly shown in FIG. 2. In the representation of FIG. 3 an amplification of 12 was chosen for small signals, i.e. for an image sensor element output voltage of less than 0.7 V. For medium-size signals, i.e. where 0.7 V< image sensor element output voltage <1.4 V, an amplification of 3 was chosen, while for image sensor element output signals with a voltage exceeding 1.4 V an amplification of 1 was chosen.

It is obvious to persons skilled in the art that the principles of the present invention are applicable to a plurality of image sensor elements which convert an illumination into an electrical signal. Furthermore, the present invention is also applicable to a one-dimensional or two-dimensional array of such image sensor elements, where, as is known, selection switches may be provided for accessing the individual image sensor elements. Since, according to the present invention, the amplification adjustment of the readout amplifier depends on the unamplified output signal of an image sensor element, the present invention provides a readout circuit output signal with a high signal-noise ratio. Due to the simple layout the image sensor elements and readout circuits can, according to the present invention, be realized without difficulty on an integrated circuit with restricted chip area.

What is claimed is:
1. An optical detector comprising:
   at least one image sensor element which generates an image sensor element output signal according to the illumination incident on said element;
   a readout amplifier switchable between a plurality of amplification stages for the one or each image sensor element for amplifying the respective image sensor element output signal;
   an amplification switch for comparing the image sensor element output signal with at least one given threshold value before said signal is amplified by the readout amplifier and for switching between the amplification stages of the readout amplifier depending on the result of the comparison; and a first output signal indicating the amplified image sensor element output signal and a second output signal indicating the amplification stage to which the amplifier is switched.

2. An optical detector according to claim 1, wherein the image sensor element, the readout amplifier and the amplification switch are integrated on an integrated circuit.

3. An optical detector according to claim 1, wherein the amplification of the readout amplifier can be switched by switching capacitors with different capacitances into the feedback path of the operational amplifier.

4. An optical detector according to claim 1, wherein the amplification switch comprises an analog/digital converter and a coder and where the coder effects the switching of the amplification of the readout amplifier.

5. A method for detecting an optical signal, comprising the steps of:

converting the optical signal into an electrical signal by means of an image sensor element;

comparing the electrical signal with at least one given threshold value;

switching the amplification of a readout amplifier between a plurality of amplification stages depending on the result of the comparison;

amplifying the electrical signal according to the amplification stage to which the amplifier is switched to generate an amplified electrical signal; and outputting a first output signal indicating the amplified electrical signal and a second output signal indicating the amplification stage to which the amplifier is switched.

6. A method according to claim 5, wherein, with decreasing electrical signals, the amplifier is switched to amplification stages having a higher amplification.

* * * * *